United States Patent [19]

Billett et al.

[11] Patent Number: 5,172,645
[45] Date of Patent: Dec. 22, 1992

[54] MEANS FOR DISPENSING GRANULAR AGRICHEMICAL PRODUCTS

[75] Inventors: Ronald J. Billett, Sunnyvale, Calif.; Samuel F. Tutt, Balaton, Minn.

[73] Assignee: FMC Corporation, Chicago, Ill.

[21] Appl. No.: 648,451

[22] Filed: Jan. 25, 1991

Related U.S. Application Data

[63] Continuation-in-part of Ser. No. 394,345, Aug. 15, 1989, abandoned.

[51] Int. Cl.$^5$ .............................................. A01C 15/00
[52] U.S. Cl. ........................................ 111/67; 111/170
[58] Field of Search ...................... 111/14, 37, 40, 41, 111/170, 926, 67

[56] References Cited

U.S. PATENT DOCUMENTS

| | | | |
|---|---|---|---|
| 2,748,986 | 6/1956 | Steel | 111/170 X |
| 2,756,702 | 7/1956 | Brinton | 111/67 |
| 2,930,336 | 3/1960 | Schnell | 111/67 |
| 2,953,999 | 9/1960 | Hyland et al. | 111/67 |
| 2,968,264 | 1/1961 | Schnell | 111/67 |

FOREIGN PATENT DOCUMENTS

| | | | |
|---|---|---|---|
| 290567 | 3/1916 | Fed. Rep. of Germany | 111/67 |
| 2034562 | 6/1980 | United Kingdom | 111/170 |

Primary Examiner—Randolph A. Reese
Assistant Examiner—Jeffrey L. Thompson
Attorney, Agent, or Firm—Ronald C. Kamp; R. B. Megley

[57] ABSTRACT

A granular dispenser for a planter having a closure means for sealing the hopper which is operated by a hydraulic cylinder which is connected in parallel with the hydraulic cylinder normally provided on a planter for raising and lowering the planter tool bar so that the closure means is fully closed before the planter begins to raise and remains closed until the planter is fully lowered.

8 Claims, 6 Drawing Sheets

FIG_1

FIG_2

FIG_3

FIG_4

FIG_5

FIG_6

FIG_7

FIG_8

FIG_9

MEANS FOR DISPENSING GRANULAR AGRICHEMICAL PRODUCTS

This application is a continuation-in-part of U.S. patent application Ser. No. 07/394,345, filed Aug. 15, 1989, now abandoned.

This invention relates to farm equipment generally, and more particularly, to means associated with planters for dispensing granular agrichemical products, such as insecticides.

Granular insecticides, which are widely used in farming, are distributed into or adjacent the furrows during the planting operation. Commercially available planters are employed in the planting operation and are typically capable of planting a plurality of crop rows in a single pass with each row unit of the planter forming a furrow of proper depth, depositing the seeds at the proper interval, and finally closing the furrow, i.e., covering the seeds and firming the soil around the seeds. The granular insecticides, which are distributed in a continuous band are generally mixed with soil during the closing of the furrow. The planter, and the tractor towing the planter, must turn through 180° at the end of each pass across the field in order to make another pass parallel to the last. During this turn, the planter row units must be raised out of contact with the ground. Any granular insecticide which is distributed while the planter is in the process of being elevated and while it is so elevated will remain on top of the soil, representing a potential hazard to wildlife, as well as being generally wasted since the band of insecticide would not be aligned with or properly adjacent to crop rows; the headland area often being planted, if at all, at right angles to the field per se. It is important that the insecticide distribution be interrupted during such turns and that when distribution is resumed that it be accomplished in such a way that the band of insecticide be uniform and incorporated into the soil.

The present invention provides a granular distributor which is capable of stopping the flow of the granular products whenever a planter is raised from its lowered planting position, which assures that such products are distributed as uniformly as possible along the rows, which stops the flow of the granular products before the planter begins to be raised from its lowered planting position and does not resume such flow until the planter is in its fully lowered planting position in order that all distributed granular product may be incorporated into the soil, which is relatively inexpensive and easy to manufacture and maintain, and which may readily be incorporated into existing planters.

These and other attributes of the present invention, and many of the attendant advantages thereof, will become more readily apparent upon a perusal of the following description and the accompanying drawings of a preferred embodiment, wherein:

Figure 1:
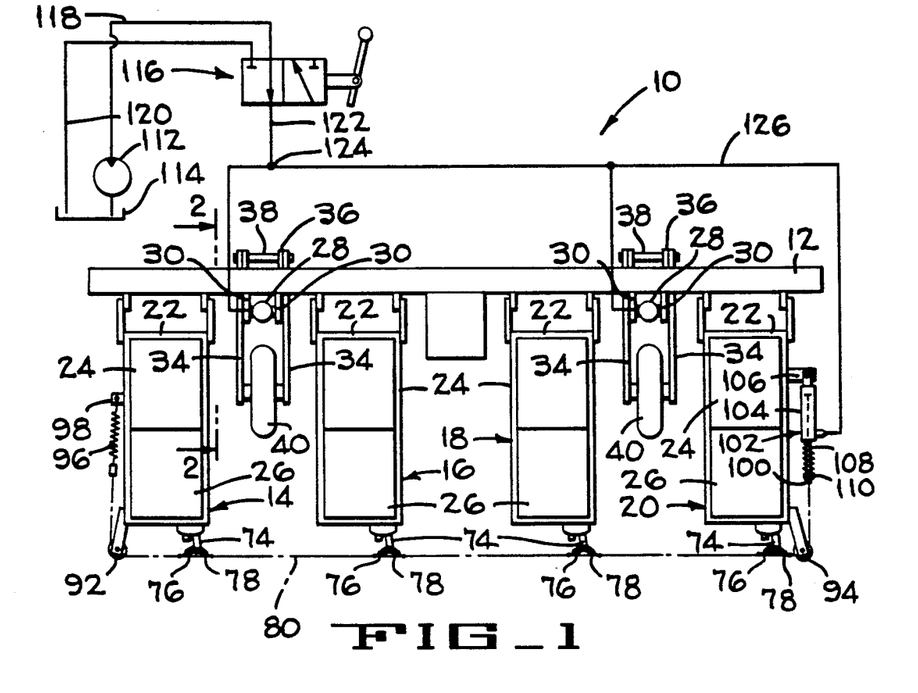
FIG. 1 is a top plan view of a four-row planter incorporating the present invention with the hydraulic circuit, a portion of which is incorporated into the tow tractor, represented schematically.

Referring now to FIG. 1, there is shown a planter, indicated generally at 10, which for illustration purposes is a four-row unit. The planter 10 has a tool bar or frame 12 which is attached to a tractor, not shown, by any conventional means, such as a tow bar or three-point hitch, for example, to permit the tractor to pull the planter 10 through the field. Four essentially identical row units 14, 16, 18 and 20 are mounted on the tool bar 12, each unit having a frame 22 suspended by a four-bar linkage from the tool bar. Each frame 22 supports a seed hopper 24, and a second hopper 26 which may be divided into two compartments, one for insecticides and one for a herbicide or fertilizer.

Figure 2:
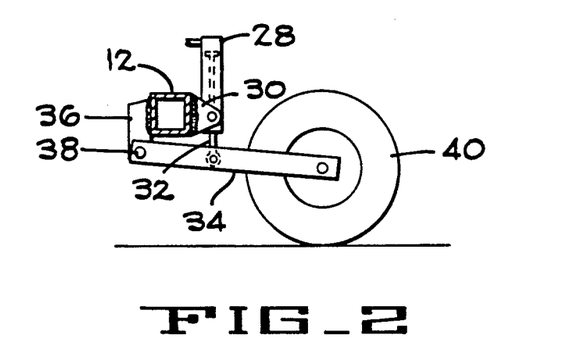
FIG. 2 is a sectional view taken on line 2—2 of FIG. 3.

As best seen in FIG. 2, the tool bar 12 can be raised and lowered by a pair of hydraulic jacks 28. Each jack 28 has its cylinder pivotally connected to a pair of ears 30 affixed to the tool bar 12 and the end of its rod 32 pivotally attached to a pair of arms 34. The arms 34 are pivotally attached to brackets 36 affixed to the tool bar 12 by pin 38. Wheels 40 are rotatably mounted between the free ends of each pair of arms 34. When the jacks 28 are extended the arms 34 are pivoted about the pin 38 causing the tool bar 12 to be elevated and retracting the jacks 28 will permit the tool bar to be lowered.

Figure 3:
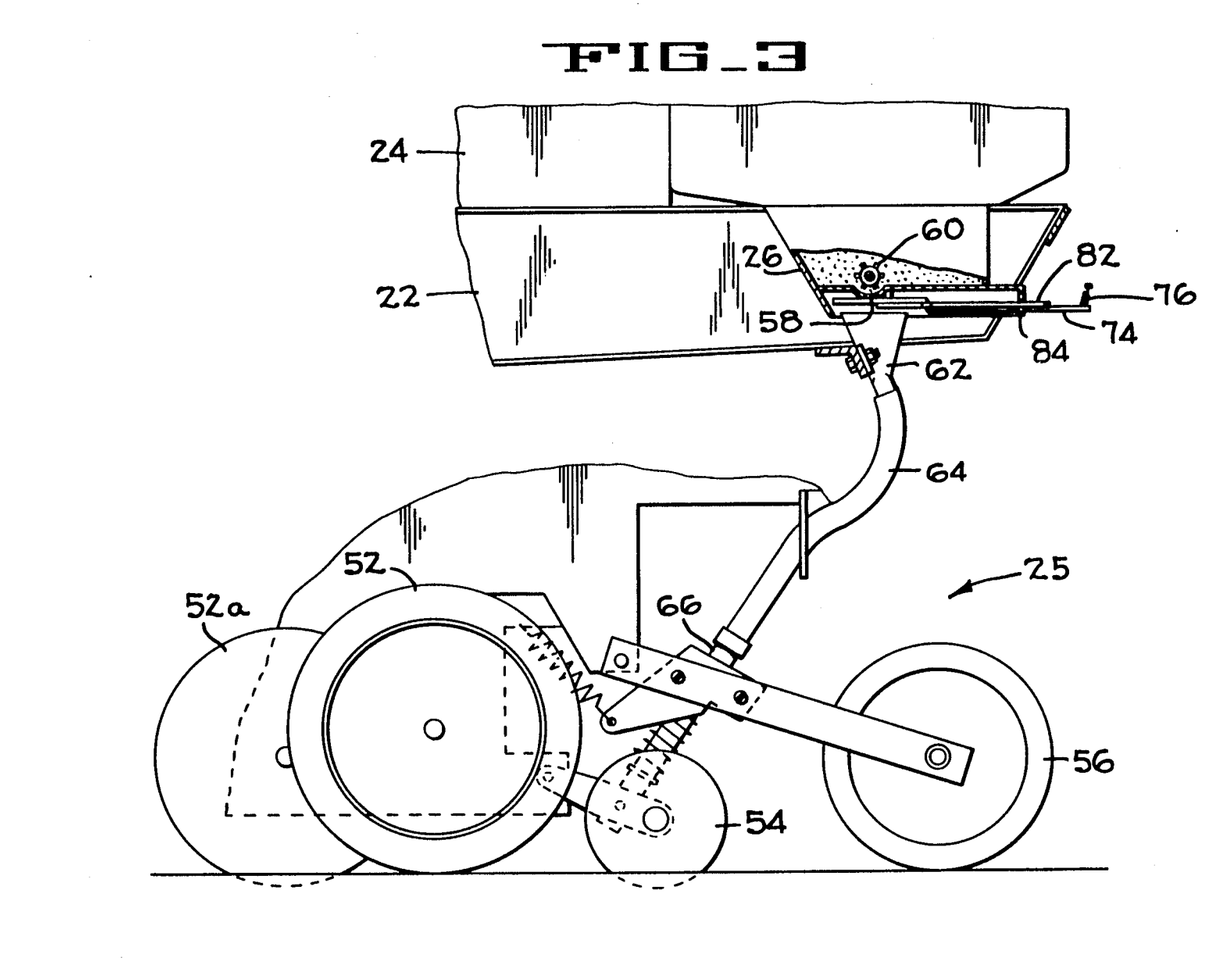
FIG. 3 is a side view of one of the row units of the planter shown in FIG. 1 with portions broken away and in section for clarity.

A typical planter mechanism, indicated generally at 25 in FIG. 3, is suspended from the previously mentioned tool bar 12, as row units 14, 16, 18 and 20. Such mechanisms vary but include a furrow forming wheel set 52, surface wheels 52a to control the depth of the furrow formed by the wheel set 52 and a pair of closing wheels or disks 54. A press wheel 56 may also be provided. The granular insecticide hopper 26 has a discharge opening 58 which may be a slit with a rough dimension of ¼ inch by 2 inches. An impeller wheel 60, which is ground driven by the press wheel on the planter itself, is rotatably mounted in said hopper 26 directly above the discharge opening and serves to feed the granular material into the opening 58. A funnel 62 is supported from the frame 22 and is positioned with its wider end directly below the discharge opening 58 to receive the granular product which drops through the opening 58. A flexible tube 64 connects the smaller end of the funnel 62 with a rigid tube 66 mounted on the support for the disks 54 to direct the product between the disks 54. Granular material tends to be incorporated into the soil by the action of the closing disks 54.

Figure 4:
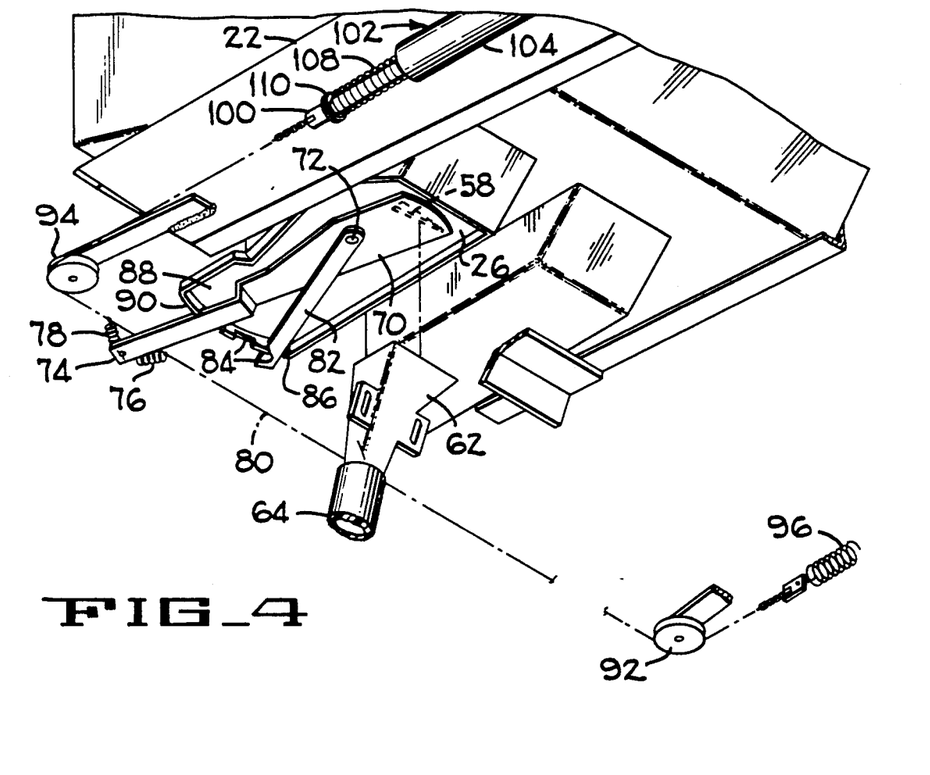
FIG. 4 is a pictorial view of the underneath side of the row unit shown in FIG. 3.

As best seen in FIG. 4, a closure plate 70 is pivotally mounted by pin 72 on the bottom of hopper 26 and is capable of completely covering and sealing the discharge opening 58. An offset actuating arm 74 is formed on the plate 70 and is connected by a pair of tension springs 76 and 78 to a flexible tension member, which preferably is a relatively low cost chain 80. Movement of the chain 80 toward the upper left will cause the springs 78 to pivot the plate 70 to the position shown, while movement of the chain 80 toward the lower right will pivot the plate 70 to uncover the discharge opening 58. How much of the discharge opening 58 is uncovered is determined by the position of the limit bar 82, which is pivotally mounted on pin 72 and is engageable with notches 84 formed in an arcuate flange 86 formed on a plate 88 attached to the frame 22. The setting of the limit bar 82 will determine how far the plate 70 will pivot to uncover the discharge opening 58; the offset in the arm 74 contacting the limit bar 82 and thereby determining the amount the discharge opening is uncovered. The spring 76 functions as a simple lost motion connection to compensate for the difference between the travel or motion of the chain 80 and the travel permitted by the limit bar 82. The spring 76 also exerts a force on the arm 74 to keep the setting of the opening 58 unaffected by vibrations. A stop 90, consisting essentially of an elongated portion of the flange 86, is positioned to be engaged by the arm 74 when the discharge opening 58 is fully covered. The spring 78 functions as a lost motion connection to compensate for the differences between chain travel and the travel permitted by the stop 90.

The chain 80 is trained over a pair of pulleys 92 and 94 rotatably mounted from the frames of the outer row units 14 and 20, respectively. One end of the chain 80 is attached to a tension spring 96 which is secured by a bracket 98 mounted on the outer surface of the frame 22 for the end row unit 14. The other end of the chain 80 is attached to the rod 100 of a hydraulic jack 102. The cylinder 104 of the jack 102 is pivotally mounted on a bracket 106 secured to the outer side of the frame 22 for row unit 20. The jack 102 is preferably of the single acting type with pressure causing retraction and spring force extension. The spring 96 could provide sufficient force for extension, but in doing so, would require the chain 80 to withstand higher tension forces. The provision of a compression spring 108 trapped on the rod 100 between the cylinder 104 and a collar 110 secured to the rod 100 will provide sufficient force for extension of the rod 100, such force being needed to overcome the resistance to flow of the hydraulic fluid through the lines and valve back to the tank, without subjecting the chain 80 to such force.

The hydraulic power is supplied by a pump 112, driven by the engine of the tractor, not shown, which draws fluid from a hydraulic reservoir or tank 114 and supplies hydraulic fluid under pressure to one part of a control valve 116 through conduit 118. The valve 116 is conveniently mounted on the tractor and may be a two-position, three port valve. A conduit 120 connects another of the valve ports to the reservoir 114 and a conduit 122 connects with the third port of the valve 116. The conduit 122 branches at 124 to connect the valve with both of the jacks 28. A conduit 126 also connects with the conduit 122 and with the rod end of the cylinder 104. When the valve 116 is positioned as shown in the drawings, hydraulic fluid under pressure as directed to conduit 122 and hence to the jacks 28 to cause extension thereof and to the jack 102 to cause retraction thereof. When the valve 116 is first moved to the position shown, the jack 102 will be fully contracted before the jacks 28 can be extended because the weight of the planter 10 is much greater than the combined forces exerted by the springs 96 and 108. Since the hydraulic fluid will take the path of least resistance, the jack 104 will contract first causing the chain 80 to move the levers 74 to close the discharge opening 58 of each row unit. Jacks 28 are then extended to cause wheels 40 to raise the complete planter unit off the ground in preparation for turning.

When the valve 116 is shifted to the left, as viewed in FIG. 1, the jacks 28 and 102 will all be connected to the reservoir 114 through the conduit 120. The heavy weight of the planter 10 acting downward will cause the jacks 28 to collapse before the jack 102 will be able to extend under the urging of the springs 96 and 108. The planter 10 will thus be fully operational with the furrow opening and closing disks in the ground before the jack 102 can move the chain 80 to open the discharge nozzle.

A clamp may be positioned across jack 104 to prevent its extension when hydraulic pressure is removed. Such a clamp will be found advantageous in keeping the insecticide flow path closed when the planter is in storage, or being moved between storage and field.

Figure 5:
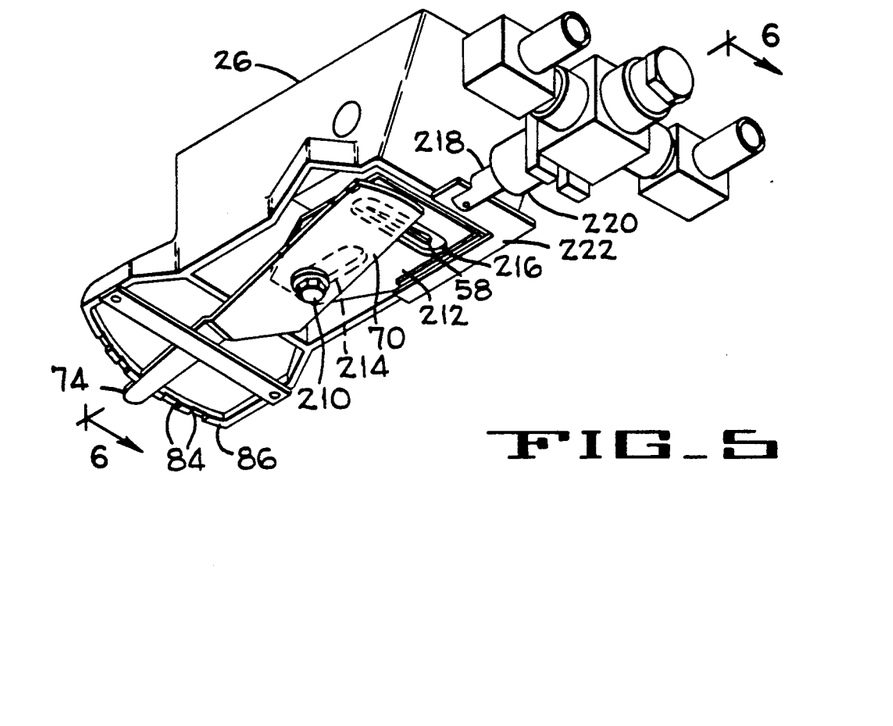
FIG. 5 is a view similar to FIG. 4 of another embodiment of the present invention.
Figure 6:
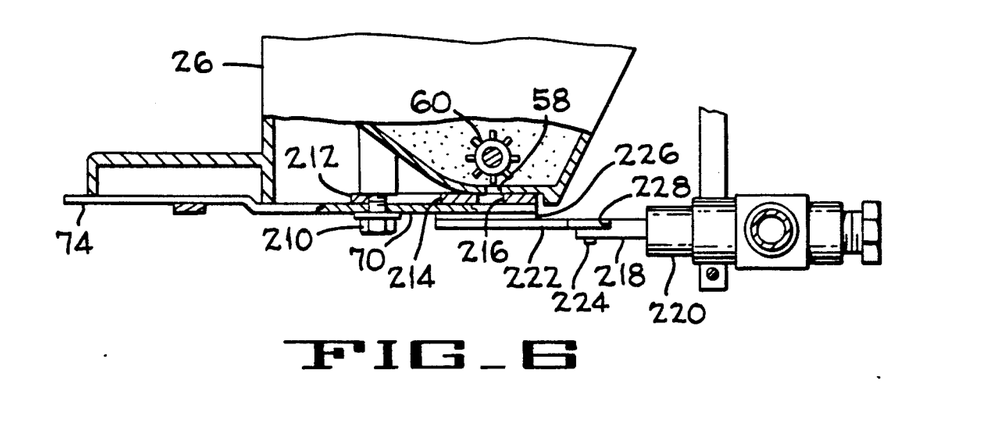
FIG. 6 is a cross-sectional view taken on line 6—6 of FIG. 5.

The embodiment shown in FIGS. 5 and 6 utilizes a closure plate 70 mounted by bolt 210 to the bottom of the hopper 26 and pivotally movable on the bolt 210 to a plurality of positions by arm 74. The closure plate 70 is thus adjustably positionable to control the rate of application by varying the amount the discharge opening 58 in the bottom of the hopper 26 is uncovered in the same manner as the embodiment shown in FIGS. 3 and 4. However, in the embodiment of FIG. 5 the arm 74 actually engages the notches 84 formed in the flange 86 and, once positioned manually to control rate of application, do not move to prevent discharge of material when the planter is raised at the end of the row. That function, viz., the cut-off of material before the planter is raised and the continuation of discharge only after the planter is fully lowered, is controlled by a shutter 212 positioned between the bottom of the hopper 26 and the closure plate 70. The shutter 212 has a slot 214 through which the bolt 210 extends. The slot 214 permits the shutter 212 to reciprocate between closed and discharge positions positions so that a registry opening 216 therein, which opening is complementary to the discharge opening 58, may completely cover or register with the discharge opening 58. The shutter 212 is connected to the piston rod 218 of a small hydraulic cylinder 220 fixed to the planter frame. In order to provide clearance for the closure plate 70, the connection between the shutter 212 and the rod 218 is through an angled or L-shaped plate 222. The plate 222 has a transverse leg extending transverse to the rod 218 and pinned to the rod 218 by pin 224, and a parallel leg extending parallel to the rod 218 and along the side of the shutter 212 opposite the side thereof over which the closure plate 70 can extend in its range of pivotal positions. A spacer block 226 is secured to the plate 70 and to the parallel leg so that the transverse leg and rod 218 may pass below the closure plate 70 without interference. The cylinder 220 is single-acting and, when pressurized by hydraulic fluid, extends the piston rod 218 to cause the shutter 212 to move to the left, as viewed in FIG. 6, and close-off or block the discharge opening 58. A spring, not shown but an integral part of the hydraulic cylinder 220 as sold by various hydraulic component manufacturers as an off-the-shelf component, causes the cylinder rod 218 to retract when the pressure in the cylinder 220 is released. Retraction of the rod 218 moves the shutter 212 to the position shown in FIG. 6 wherein the opening 216 in the shutter 212 registers with the discharge opening 58 in the hopper 26. While the connection of the transverse leg of the plate 222 to the rod 218 is through the pin 224, only slight pivotal movement therebetween is permitted because the transverse leg abuts a shoulder 228 formed by machining a flat surface on the rod 218. Binding that may otherwise occur, if the shutter 212 were permitted to pivot about the bolt 210, is therefore prevented. The pin 224 is also positioned in the transverse leg in a line extending along the centerline of the slot 214 in the shutter 212 ensuring straight and relatively free reciprocation of the shutter by the piston rod 218.

Figure 7:
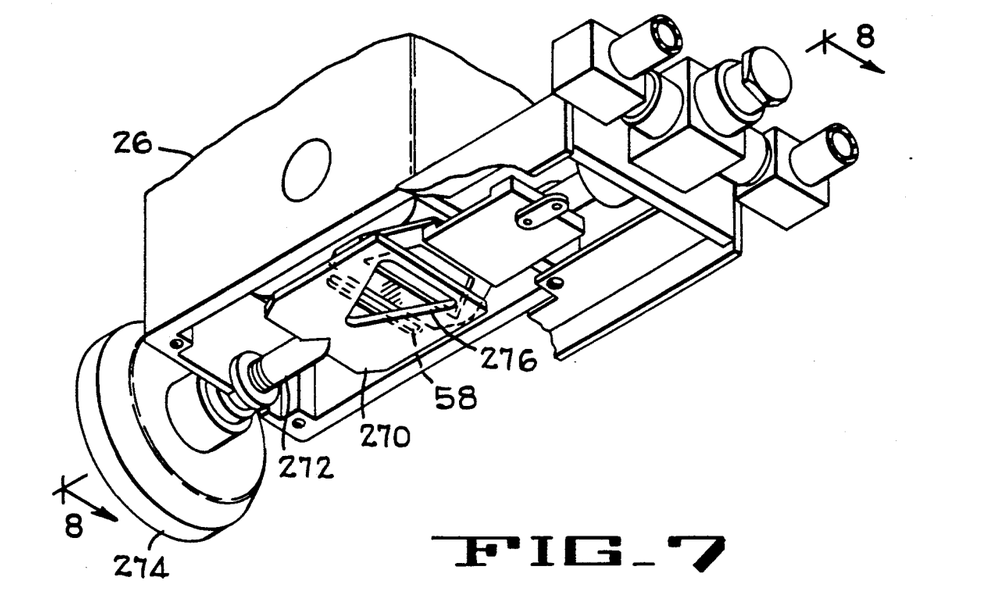
FIG. 7 is a view similar to FIGS. 4 and 5 of still another embodiment of the present invention.
Figure 8:
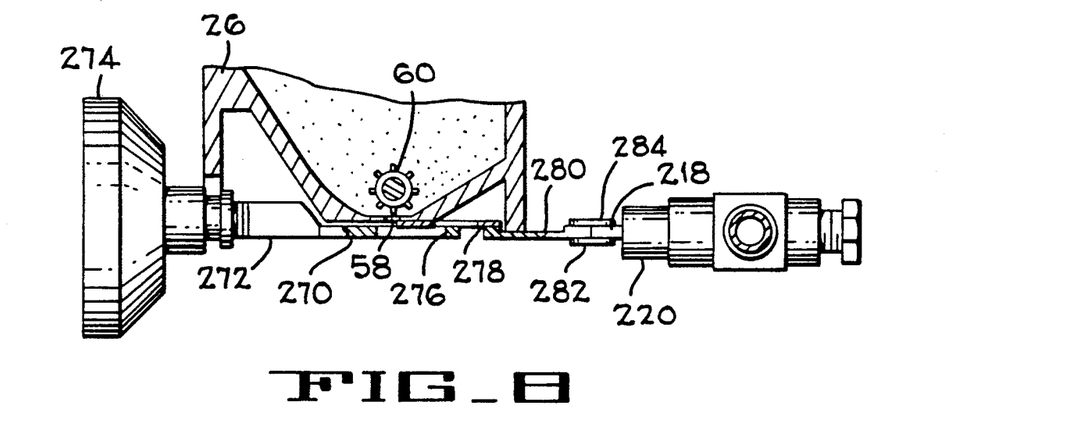
FIG. 8 is a cross-sectional view taken on line 8—8 of FIG. 7.

The embodiment shown in FIGS. 7 and 8 is similar to that in FIGS. 5 and 6. However, the closure plate 270 in this embodiment is not pivoted, as the FIGS. 5-6 embodiment is, but instead is reciprocated. A threaded rod 272 is formed integral with or otherwise secured to the plate 270. An adjusting wheel 274 is secured to the hopper 26 so that it may rotate about its central axis but is otherwise restrained. The threaded rod 272 engages a complementary threaded bore in the wheel 274 so that rotation of the wheel will cause linear translation of the closure plate 270. The plate 270 has a triangular opening 276 which is registerable with the discharge opening 58. The discharge opening 58 is a narrow slot extending transverse to the linear translation of the plate 270. The triangular opening 276 thus permits a minimum application rate of the material in the hopper when the tip thereof is positioned beneath the discharge opening 58 and a maximum rate when the base of the triangular opening 276 is positioned beneath the opening 58. Rotation of the wheel 274 thus permits setting the rate of application.

A shutter 278 is positioned between the bottom of the hopper 26 and the closure plate 270 and is reciprocated by the piston rod 218 of hydraulic cylinder 220. A connector plate 280 is secured to the shutter 278 and is connected by links 282 and 284 to the rod 218. The links 282 and 284 are connected by pins through their respective ends for convenience of assembly, but pivotal movement about the pins is held to a minimum by abutting the flat end of the rod 218 against the facing flat surface of the plate 280. This assures the straight reciprocation of the shutter 278 in response to extension and retraction of the rod 18. The shutter 278 may be of any plan configuration but must include a section sufficient to completely cover the discharge opening 58 when the rod 218 is extended. When the rod 218 is retracted, as shown in FIGS. 7 and 8, by means of the internal spring, the discharge opening 58 is completely uncovered by the shutter 278, and when the rod 218 is extended by means of hydraulic pressure, moving the shutter 278 to the left as viewed in FIGS. 8 and 9, the discharge opening 58 is covered.

Figure 9:
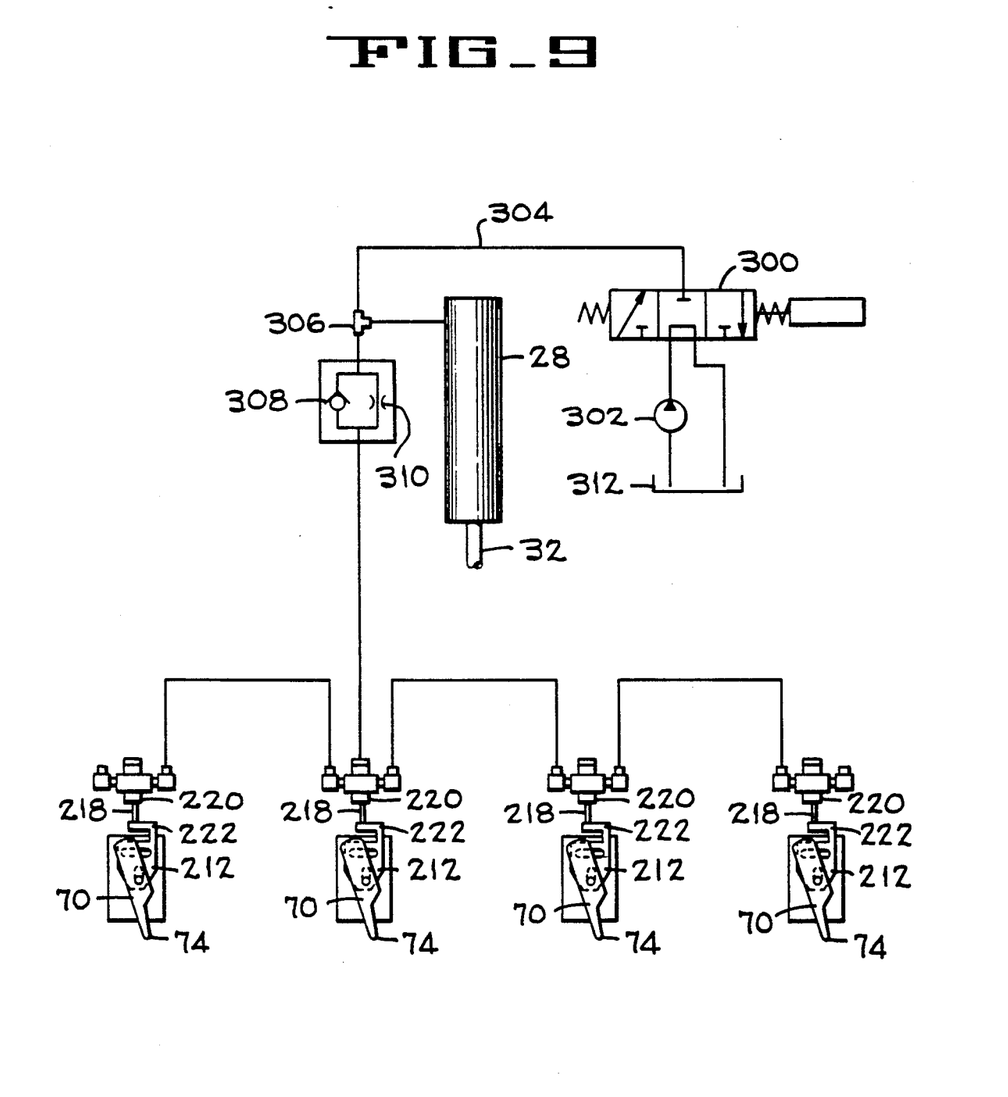
FIG. 9 is a schematic of a hydraulic circuit according to the present invention.

The shutters of the embodiments either of FIGS. 5 and 6 or of FIGS. 7 and 8 are shifted to uncover the discharge opening only after the planter has been fully lowered, and hence in a position to form a furrow, and are shifted to completely cover the discharge opening before the planter is lifted. FIG. 9 shows a convenient way to achieve this timing with a hydraulic circuit utilizing conventional hydraulic components. While FIG. 9 illustrates the circuit in connection with the embodiment of FIGS. 5 and 6, the circuit can be also used with the embodiment of FIGS. 7 and 8.

The raising and lowering of the planter is controlled by valve 300 to which hydraulic fluid under pressure is supplied from a pump 302. A conduit 304 connects the valve 300 and is connected through a tee 306 to the left cylinder 28 and to the cylinders 220; the cylinders all being connected in parallel with conventional fittings. Interposed between tee 306 and the cylinders 220 is a check valve 308 and an orifice 310 connected in parallel. When the valve 300 is in its center neutral position, as shown in FIG. 9, the conduit 304 is blocked thereby locking all cylinders. When the valve is shifted to the right, the conduit 304 is connected to receive hydraulic pressure from the pump 302. Hydraulic pressure is directed to the lift cylinder 28 and to the check valve 308. The check valve 308 is unseated and fluid is free to flow to the cylinder 220. The lift cylinder 28 is connected to lift the weight of the planter, while the cylinders 220 have very little resistance to their movement. The hydraulic fluid will flow first to the cylinders 220 causing the shutters connected thereto to close the discharge openings. After the cylinders 220 have gone to their full stroke, which is short, the hydraulic fluid will then flow to the lift cylinder 28 extending the rod 32 and lifting the planter. When the valve 300 is shifted to the left, the conduit 304 will be connected to the reservoir 312. The weight of the planter acting on the lift cylinder 28 will force hydraulic fluid through the conduit 304. Under this condition, the check valve 308 will be seated forcing any fluid from the cylinders 220 to pass through the orifice 310. The pressure drop across the orifice 310 assures that a higher pressure, resulting from the weight of the planter and the resistance to flow in the conduit 304, will exist between the orifice 310 and the valve 300 than the pressure in the conduit between the orifice and the valves 220. The lift cylinder will, therefore, be lowered into operating position before the springs in the cylinders 220 have sufficient force to cause the rods 218 hereof to be retracted. Thus, the planter will be lowered into operating position before material can be distributed from the hoppers and the shutters will be moved to cover the discharge openings before the planter is lifted. Material in the hopper is less likely to be distributed on top of the ground.

While three embodiments of the present invention have been illustrated and described herein, various changes may be made therein without departing from the spirit of the invention as defined by the scope of the appended claims.

What is claimed is:

1. In an agricultural planter having a tool bar movable between a raised non-planting position and a lowered planting position, at least one hopper for dispensing granular products mounted on said bar with a discharge opening formed in the bottom of the topper, a closure plate capable of at least partially covering said discharge opening; the improvement comprising:
   a shutter movable independent of said closure plate;
   means for moving said shutter between a closed position to block said discharge opening and an open position in which said discharge opening is unobstructed thereby, and;
   means for automatically completely moving said shutter to its closed position immediately before said bar begins movement from its lowered position toward its raised position.

2. The invention according to claim 1 wherein said means for moving said shutter comprises a hydraulic cylinder.

3. The invention according to claim 2 and further comprising:
   a lift cylinder connected to raise and lower said bar, said lift cylinder being connected in parallel with said hydraulic cylinder.

4. The invention according to claim 3 and further comprising:

a check valve permitting flow only toward said hydraulic cylinder;

an orifice connected in parallel with said check valve; and said check valve and orifice being interposed between said lift cylinder and said hydraulic cylinder.

5. The invention according to claim 1, wherein said means for moving said shutter also includes means for delaying movement of said shutter from its said closed position to its said open position until after said bar has been completely moved from its said raised position to its said lowered position.

6. In an agricultural planter having a tool bar frame capable of being moved between raised non-planting and lowered planting positions, at least one hopper for dispensing granular agrichemical products mounted on said frame with a dispensing opening formed in the bottom thereof to permit gravity discharge of said products from said hopper; the improvement comprising:

a closure means carried by said hopper and movable between an open position in which at least a portion of said discharge opening is uncovered to permit said discharge and a closed position in which said opening is completely covered to prevent said discharge; and means for moving said closure means from its said closed position to said open position only after said frame has completed its movement from its raised position to its lowered position.

7. The invention according to claim 6 and further comprising:

elevating means for moving said frame between a lowered planting position and a raised non-planting position; and means for moving said closure means to its open position only after said frame has achieved its lowered planting position and for moving said closure means to its closed position before said frame begins movement from its lowered position to its raised position.

8. The invention according to claim 6, wherein said last-mentioned means includes means for completely moving said closure means to its said closed position before said frame begins movement from its said lowered position to its raised position.

* * * * *